J. SLEPIAN.
ELECTROLYTE FOR ELECTROLYTIC CONDENSERS.
APPLICATION FILED JAN. 16, 1919.
1,326,297.
Patented Dec. 30, 1919.
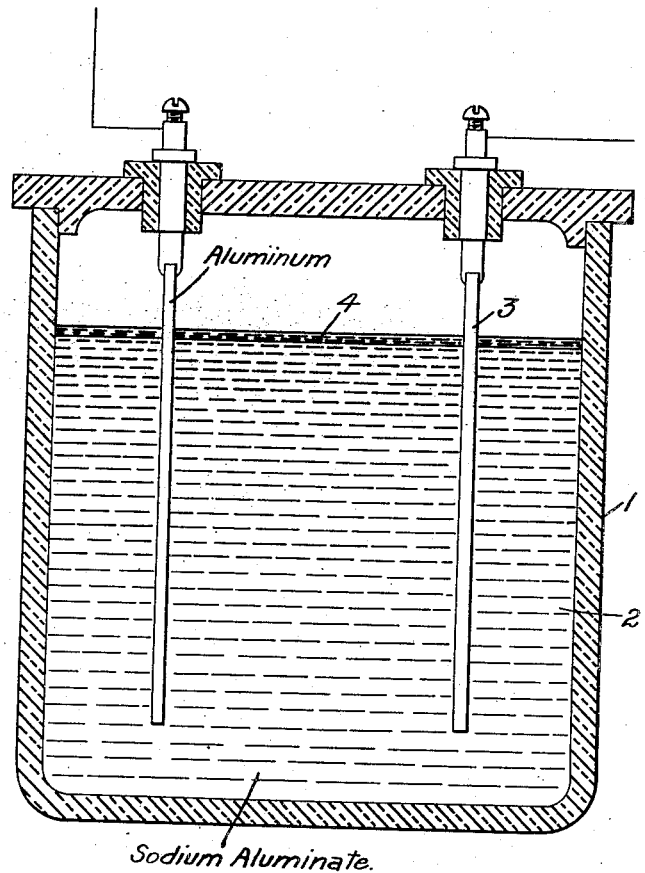
WITNESSES:
J. A. Helsel.
W. H. Woodman.
INVENTOR
Joseph Slepian.
BY
Wesley G. Carr
ATTORNEY

UNITED STATES PATENT OFFICE.

JOSEPH SLEPIAN, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTROLYTE FOR ELECTROLYTIC CONDENSERS.

1,326,297.  Specification of Letters Patent.  Patented Dec. 30, 1919.

Application filed January 16, 1919. Serial No. 271,466.

*To all whom it may concern:*

Be it known that I, JOSEPH SLEPIAN, a citizen of the United States, and a resident of Pittsburgh, in the county of Allegheny and State of Pennsylvania, have invented a new and useful Improvement in Electrolytes for Electrolytic Condensers, of which the following is a specification.

My invention relates to electrolytes for use in electrolytic cells, such as lightning arresters, condensers, rectifiers and the like, and it has for its object to provide an electrolyte which shall be capable of acting upon film-forming metals, such as aluminum, magnesium and the like, to produce plates of high electric capacity and to provide the plates with asymmetric conducting films of great endurance when subjected to potentials of considerable magnitude for long periods of time.

Electrolytes for use in cells of the above indicated character may consist of aqueous solutions of various substances, the value of such substances for this purpose being determined by the electrical characteristics which they impart to the cells, among which are the capacity of the active plates, the endurance of the films upon the plates, the power losses in the cells and the voltages which the films will withstand without rupture.

I have found that an electrolyte comprising an aqueous solution of an aluminate of an alkali earth metal, such as sodium aluminate or potassium aluminate forms a very satisfactory electrolyte for condensers, lightning arresters, rectifiers and the like, I have also found that a relatively dilute solution gives the best results.

The single figure of the drawing discloses a conventional form of electrolytic condenser comprising a container 1 for the electrolyte 2 in which are disposed the electrodes 3.

In practising my invention, the sodium aluminate solution may be prepared in any suitable manner and the solution so prepared may be employed to form asymmetric conducting films upon electrodes of suitable film-forming metals in the usual manner. If aluminum is the metal employed in the electrodes, an exceptionally strong film may be provided, as the passage of a suitable electrical current between the electrodes, through the electrolyte, will cause the $AlO_3$ ions to pass to the aluminum plates where they will combine directly with the aluminum of the plates to form the desired films of $Al_2O_3$.

An electrolyte of this character, when employed in condensers, lightning arresters, rectifiers and similar cells, is characterized by its low deteriorating effect upon the active plates of the cells, by the high capacity of the active plates and by the rapidity with which the films are formed upon the plates and are reformed after being ruptured. The latter property renders these electrolytes particularly well suited for electrolytic lightning arresters, since the cells are quickly restored to their normal condition after the films are ruptured by reason of lightning discharges.

Electrolytes of this character may be used both for initially forming asymmetric films upon plates to be used in electrolytic cells and for the continuous operation of such cells, or both. The films formed by their employment have a high break-down voltage, being capable of withstanding over 500 volts.

As an aqueous solution of sodium aluminate will deteriorate when exposed to carbon dioxid, the electrolyte is preferably provided with an air-excluding covering or seal which may be in the nature of a thin layer or film of oil floated upon its surface.

Any desired method of forming the sodium aluminate solution may be employed and various means may be resorted to, to protect it from air when it is employed in electrolytic cells. For this reason, no limitations are to be imposed upon my invention other than those indicated in the appended claims.

I claim as my invention:

1. An electrolyte for condensers, lightning arresters, rectifiers and the like comprising an aqueous solution of an aluminate of an alkali-earth metal.

2. An electrolyte for condensers, lightning arresters, rectifiers and the like comprising an aqueous solution of sodium aluminate.

3. An electrolyte for condensers, lightning arresters, rectifiers and the like comprising a dilute aqueous solution of sodium aluminate.

4. An electrolyte for condensers, lightning arresters, rectifiers and the like comprising a dilute aqueous solution of sodium aluminate having its surface covered by a film of oil.

In testimony whereof, I have hereunto subscribed my name this 27th day of Dec., 1918.

JOSEPH SLEPIAN.